US011598589B2

(12) United States Patent
Roy

(10) Patent No.: US 11,598,589 B2
(45) Date of Patent: Mar. 7, 2023

(54) ROTOR COOLING SYSTEM

(71) Applicant: Sanjay K Roy, Palmetto Bay, FL (US)

(72) Inventor: Sanjay K Roy, Palmetto Bay, FL (US)

( * ) Notice: Subject to any disclaimer, the term of this patent is extended or adjusted under 35 U.S.C. 154(b) by 166 days.

(21) Appl. No.: 17/140,541

(22) Filed: Jan. 4, 2021

(65) Prior Publication Data
US 2021/0215439 A1 Jul. 15, 2021

Related U.S. Application Data

(60) Provisional application No. 62/961,308, filed on Jan. 15, 2020.

(51) Int. Cl.
| | |
|---|---|
| *F28D 20/02* | (2006.01) |
| *F28F 5/00* | (2006.01) |
| *H02K 9/22* | (2006.01) |
| *F28F 19/00* | (2006.01) |
| *F28D 20/00* | (2006.01) |

(52) U.S. Cl.
CPC ........... *F28D 20/021* (2013.01); *F28F 5/00* (2013.01); *F28F 19/008* (2013.01); *H02K 9/225* (2021.01); *H02K 9/227* (2021.01); *F28D 2020/0078* (2013.01)

(58) Field of Classification Search
CPC ........ F28D 20/021; F28D 2020/0078; F28D 2020/0095; F28D 15/025; F28D 2015/0291; F28F 5/00; F28F 19/008; H02K 9/225; H02K 9/20; H02K 9/22; H02K 9/227
See application file for complete search history.

(56) References Cited

U.S. PATENT DOCUMENTS

| | | | | |
|---|---|---|---|---|
| 3,746,081 A | * | 7/1973 | Corman | F28D 15/046 165/272 |
| 3,842,596 A | * | 10/1974 | Gray | F28F 5/02 165/104.25 |
| 3,914,630 A | | 10/1975 | Lloyd et al. | |
| 4,003,426 A | | 1/1977 | Best et al. | |
| 4,098,649 A | * | 7/1978 | Redker | C10B 7/10 201/2.5 |
| 4,165,614 A | * | 8/1979 | Yeh | F01K 9/026 60/670 |

(Continued)

FOREIGN PATENT DOCUMENTS

| | | | | |
|---|---|---|---|---|
| CN | 101225756 A | * | 7/2008 | |
| CN | 106654318 A | * | 5/2017 | H01M 8/04 |

(Continued)

OTHER PUBLICATIONS

Heat Pipes Review, Opportunities and Challenges—Faghri (2014) (Year: 2014).*

*Primary Examiner* — Jenna M Hopkins

(57) ABSTRACT

A rotating heat pipe is used for temperature control of electric motors and generators and other rotating heat generating assemblies to ensure their proper operation. The heat pipe is integral with the shaft, and unlike conventional devices, incorporates a solid-liquid phase change material as the heat transfer/transport material. In addition, it comprises a scraped surface heat exchange mechanism at the heat dissipation region to allow for high cooling rates as required. This scraped surface mechanism is preferentially driven by a magnetic coupling to eliminate issues related to leaks of the heat transfer material.

21 Claims, 2 Drawing Sheets

(56) References Cited

U.S. PATENT DOCUMENTS

| | | | |
|---|---|---|---|
| 4,262,483 A * | 4/1981 | DeGeus | F24S 10/95 60/671 |
| 4,976,308 A * | 12/1990 | Faghri | F28D 20/023 165/41 |
| 5,220,954 A * | 6/1993 | Longardner | F28D 20/021 165/104.11 |
| 5,283,488 A * | 2/1994 | Ponnappan | H02K 1/278 310/55 |
| 5,565,132 A | 10/1996 | Salyer | |
| 5,589,720 A | 12/1996 | Berger | |
| 6,011,334 A * | 1/2000 | Roland | H02K 7/11 310/104 |
| 6,200,681 B1 | 3/2001 | Jahns et al. | |
| 6,208,512 B1 * | 3/2001 | Goldowsky | F16C 33/107 361/679.48 |
| 6,329,731 B1 | 12/2001 | Arbanas et al. | |
| 6,734,585 B2 | 5/2004 | Tornquist et al. | |
| 7,009,317 B2 | 3/2006 | Cronin et al. | |
| 7,156,195 B2 | 1/2007 | Yamagishi et al. | |
| 7,442,410 B2 | 10/2008 | Xing et al. | |
| 7,443,062 B2 | 10/2008 | Dong et al. | |
| 7,569,955 B2 | 8/2009 | Hassett et al. | |
| 7,579,725 B2 | 8/2009 | Zhou et al. | |
| 7,994,668 B2 | 8/2011 | Gerstler et al. | |
| 8,450,888 B2 | 5/2013 | Shafer et al. | |
| 9,257,883 B2 * | 2/2016 | Büttner | H02K 9/14 |
| 9,331,552 B2 | 5/2016 | Fedoseyev et al. | |
| 9,404,392 B2 * | 8/2016 | Kare | H02K 7/1823 |
| 9,752,832 B2 * | 9/2017 | Kare | F28D 15/04 |
| 2005/0051300 A1 * | 3/2005 | Searls | F28D 20/021 165/104.21 |
| 2007/0151969 A1 * | 7/2007 | Tain | F01K 13/006 219/631 |
| 2008/0178589 A1 * | 7/2008 | He | F03D 9/007 310/48 |
| 2009/0242174 A1 * | 10/2009 | McCutchen | F01K 25/08 165/104.25 |
| 2012/0169158 A1 * | 7/2012 | Buttner | H02K 1/32 29/596 |
| 2021/0215439 A1 * | 7/2021 | Roy | H02K 9/225 |

FOREIGN PATENT DOCUMENTS

| | | | | |
|---|---|---|---|---|
| CN | 207439223 U | * | 6/2018 | |
| CN | 110631400 A | * | 12/2019 | |
| CN | 111829570 A | * | 10/2020 | F28C 3/005 |
| CN | 112325686 A | * | 2/2021 | F28D 15/046 |
| CN | 114111409 A | * | 3/2022 | F28D 15/043 |
| DE | 19921066 A1 | * | 11/1999 | F03G 6/04 |
| EP | 0316966 A2 | * | 5/1989 | |
| EP | 3723123 A1 | * | 10/2020 | H01L 23/473 |
| KR | 20210110249 A | * | 9/2021 | |
| TW | I275757 B | * | 3/2007 | |
| WO | WO-0138811 A1 | * | 5/2001 | C09K 5/00 |
| WO | WO-2013089678 A1 | * | 6/2013 | C09K 5/10 |

* cited by examiner

ROTOR COOLING SYSTEM

RELATED APPLICATION

This application claims the benefit of U.S. Provisional Appl. Ser. No. 62/961,308 filed on Jan. 15, 2020—the contents of which are incorporated by reference herein.

FIELD OF INVENTION

This invention relates to temperature control of rotating shafts or assemblies. It is specifically designed for cooling rotors of electrical machinery such as motors or generators to ensure proper operation and high reliability. It is particularly well suited for use with high power, compact motors that are used in mobile applications such as electric vehicles. It can also be used in other systems where there is a need to remove large amounts of heat from compact rotating assemblies to ensure that their temperatures remain within acceptable limits.

BACKGROUND OF THE INVENTION

Rotating shafts or assemblies are incorporated in numerous mechanical and electromechanical systems. When used in power generation/transmission or high temperature applications, it is often necessary to cool them to ensure that their temperature remains within acceptable limits. The underlying reason for this may vary, e.g. (a) to maintain structural integrity of the rotating shaft/assembly under high mechanical loads and temperature, (b) to ensure reliable operation and a long system life, (c) to enhance efficiency and maximize power generation/transmission, (d) to optimize the operating conditions for an industrial process, etc.

The problem of temperature control of a product or process is relatively simple when the heat flux (i.e. the heat transfer rate per unit area) and overall heat dissipation requirements are low. Unfortunately, this is not the case for high power compact assemblies where the overall heat load and/or level of heat flux often impose real constraints on their performance. Though this can occur in many applications such as rolling mills, dynamometers, gearboxes, turbines, etc., the following discussion focuses on electric motors (and generators) that used in mobile systems such as automobiles and other vehicles. This is done due to the current importance of electric drives (and for convenience and brevity), and does not preclude the use of this invention in other applications.

For electric motors/generators, most of the heat dissipation requirements are typically from the stator assembly and other static elements. Though the heat transfer requirements may be lower for moving elements (e.g. the rotor assembly), the problem is far more difficult to solve when it exists. In recent years, this has become an increasingly important issue in motors for electric vehicles where motor size, weight and cost are critical.

DESCRIPTION OF THE PRIOR ART

A number of different approaches have been used for temperature control of rotating shafts/assemblies. For stationary motors and generators, size and weight are typically not a significant issue. As a result, air cooling is usually adequate. This is accomplished via suitable vents on the casing that allow air to access the motor interior for internal cooling. Direct conduction through the motor structure also transfers heat to the exterior surfaces where large fins are used to dissipate it to the ambient. Fans or blowers may integrated with the motor when normal external air flows are not adequate and dedicated forced air cooling becomes necessary.

For enclosed and many high power motors, direct air cooling cannot provide adequate temperature control. The typical approach here is to replace air cooling by liquid cooling. In its simplest form, the motor includes a cooling loop comprising a pump, a cooling jacket on the motor exterior (i.e. a heat exchanger attached to the stator/motor casing), a radiator and related ducts/pipes, control valves, etc. During operation, heat conducted out from the motor is absorbed by the liquid coolant flowing through the cooling jacket and is dissipated to the ambient at the radiator. In more advanced designs, elaborate cooling channels are included within the stator assembly to ensure more uniform cooling and better performance. Cooling of the rotating shaft/rotor assembly is then done using two basic approaches:

a. Liquid flow paths are incorporated within the rotor assembly to absorb heat directly from the rotor and transport it to the motor-wide liquid cooling loop. This approach may include fully integrated pumps, liquid spray systems, etc. (e.g. Berger (U.S. Pat. No. 5,589,720, 1996), Arbanas et al. (U.S. Pat. No. 6,329,731, 2001), Tornquist et al. (U.S. Pat. No. 6,734,585, 2004), Cronin et al. (U.S. Pat. No. 7,009,317, 2006), Yamagishi et al. (U.S. Pat. No. 7,156,195, 2007), Zhou et al. (U.S. Pat. No. 7,579,725, 2009), Gerstler et al. (U.S. Pat. No. 7,994,668, 2011), Shafer et al. (U.S. Pat. No. 8,450,888, 2013)), and can solve the rotor temperature control problem in principle. However, these methods have some limitations:

It is difficult to provide uniform cooling since the rotor assembly is enclosed by the stator assembly and is not readily accessible. This constraint cannot be easily overcome since stator-rotor configurations cannot be modified beyond a certain point without affecting the motor performance adversely.

More uniform cooling of the rotor assembly is sometimes obtained by using by using hollow shafts with internal flow channels. However, the mechanical design is more complex since this requires the use of fluid connectors that couple with a rotating shaft/rotor assembly. This in turn reduces system reliability and life.

b. In an alternative approach, heat pipes are used to cool the rotor assemblies instead of pumped cooling loops (e.g. Gray (U.S. Pat. No. 3,842,596, 1974), Lloyd et al. (U.S. Pat. No. 3,914,630, 1975), Dong et al. (U.S. Pat. No. 7,443,062, 2008), Hassett et al. (U.S. Pat. No. 7,569,955, 2009), Fedoseyev et al. (U.S. Pat. No. 9,331,552, 2016)). In this method, rotating heat pipes are incorporated (or integrated) within hollow shafts, and are used to transfer heat from the interior regions to the ends of the shaft/rotor assemblies along their rotational axis. Alternatively (or simultaneously), revolving heat pipes are placed parallel to the rotational axis in different locations within the rotor assembly to transfer heat from the interior to a region near the end(s) of the shaft. The rationale for using heat pipes are as follows:

The heat transfer fluid in a heat pipe is in a completely sealed enclosure where the heat transfer/transport processes result from internal centrifugal (in a rotating heat pipe) and/or capillary forces (that also work in stationary systems). Since no external flow connectors or driving mechanisms are used, heat pipes are very reliable.

Heat pipes are very efficient heat transfer devices since they rely on evaporation/condensation processes. Thus, their use results in relatively uniform temperatures along the lengths of the shaft/rotor assemblies.

By using heat pipes, the heat generated within the rotor assembly is transferred to its end(s). This simplifies the motor cooling system since it is easier to dissipate heat from only the end(s) of a rotating shaft/rotor assembly than its entire length which is mostly enclosed by the stator assembly.

Heat pipe based cooling systems can overcome the non-uniformity and complexity issues associated with the pumped loop system. However, for a given size, heat pipes are limited by their overall heat transfer capacity due to the fundamentals of the heat transfer/fluid flow processes involved. This results from the limits placed by (a) the rate of evaporation of the heat transfer fluid at the heat absorption surface(s) and (b) the mass flow rate of the fluid within the heat pipe. These cannot be increased without increasing the heat pipe internal volume/size since vapor densities are much smaller than liquid densities, and high heat transfer rates can increase vapor volumes/pressures rapidly causing heat pipe failure. Since size constraints are not uncommon, heat pipe based cooling systems are not viable for some high power, compact motors/generators.

SUMMARY OF THE INVENTION

The object of this invention is to provide a completely new type of heat pipe based cooling system for temperature control of rotating shafts/rotor assemblies that overcomes the disadvantages of conventional heat pipes as mentioned above. The invention achieves this by combing the following:
- a rotating heat pipe that incorporates a solid-liquid phase change material as the heat transfer/transport material, and
- an internal "surface-scraping" mechanism at the heat dissipation region to allow for high cooling rates as required.

DETAILED DESCRIPTION

Figure 1:
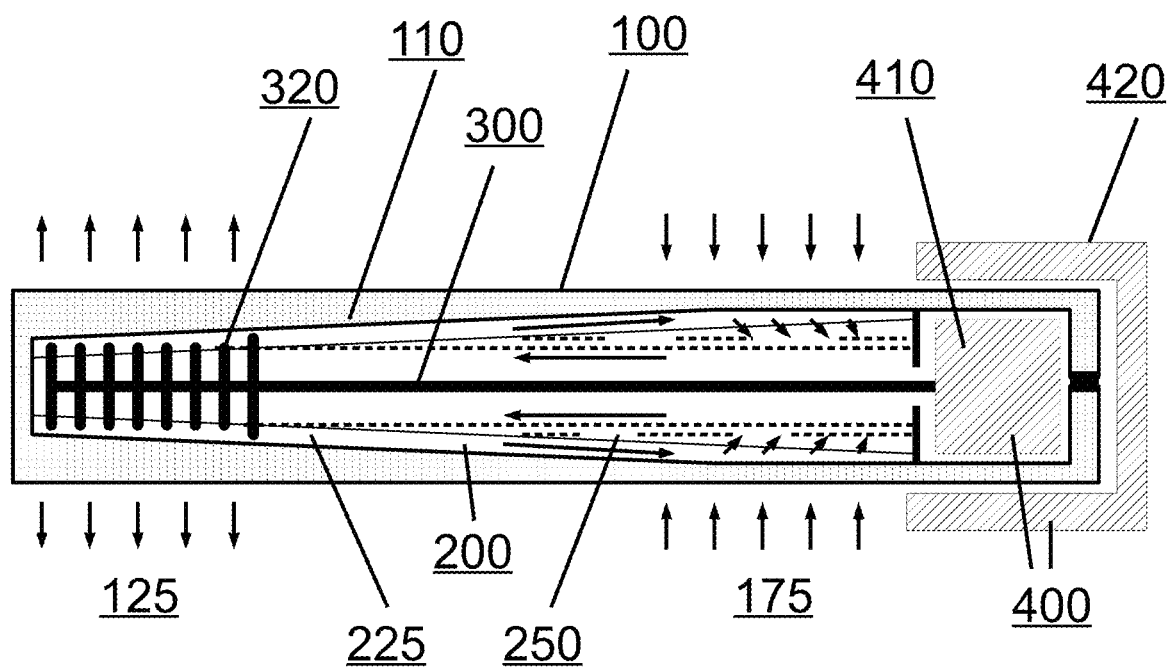
FIG. 1 is a schematic sectional diagram of a rotating solid-liquid heat pipe per this invention.

FIG. 1 is a schematic view of a preferred embodiment of the rotating solid-liquid heat pipe which is the basis of the present invention. It consists of three sections,
- a rotating hollow tube/enclosure (100) containing a solid-liquid phase change material (200) in its interior sealed volume,
- a scraper assembly (300) positioned within the hollow tube/enclosure (100) to remove solid phase change material from the interior surface(s) of the heat dissipation region/zone (125), and
- a driver (400) that ensures relative motion between the scraper assembly (300) and the hollow tube/enclosure (100) so that it functions as a scraped-surface heat exchanger at the heat dissipation region (125).

The hollow sealed tube/enclosure (100) functions as the primary heat absorption/dissipation component of the overall assembly. Thus, a thermally conductive material is used for its structure, particularly in its heat dissipation (125) and heat absorption (175) regions (e.g. aluminum, though metals such as steel are also acceptable in most cases). In the preferred embodiment, its internal wall (110) is tapered linearly with a larger cross-section area at the heat absorption zone (175) as compared to the heat dissipation zone (125). Its internal volume contains a solid-liquid phase change material (200) that functions as the heat transfer medium. It is selected to have the following properties which are typical of a solid-liquid phase change latent heat energy storage material:

- The phase change temperature must be lower than the design (or minimum) temperature of the heat source at the heat absorption zone(s) and greater than the design (or maximum) temperature of the heat sink at the heat dissipation zone(s). To ensure high performance, it is preferable that the melting and solidification temperatures are identical and close to the heat source temperature. However, the performance can be acceptable even this is not the case, and the heat pipe will function as long as the melting temperature is lower than the temperature at which heat absorption occurs and the solidification temperature is greater than the temperature at the heat dissipation zone.
- Phase change materials melt/solidify over a temperature range or at a fixed temperature (i.e. the range is very small/negligible, ~<0.5-1 C) depending on their composition. A material with a fixed melting/solidification temperature (i.e. a "pure" material or an eutectic mixture) and no supercooling is an ideal choice for a solid-liquid heat pipe. However, it may be preferable to use a phase change material that melts/solidifies over a temperature range due to cost and other considerations. For such materials, it is important that the bulk (preferably all) of the phase change occurs between the heat absorption and dissipation temperatures.
- The phase change material must be selected with a high latent heat of melting/solidification since the performance of the heat pipe increases with higher latent heat. Note that the volumetric latent heat ($\rho h_{fs}$ where $\rho$ is the density and $h_{fs}$ is the latent heat per unit mass) is important in this application due to the enclosed/fixed volume of the heat pipe. Most solid-liquid phase change materials are acceptable since their typical volumetric latent heat of melting/solidification ($=\rho h_{fs} \sim (10^3 \text{ kg/m}^3)(10^5 \text{ J/kg}) = 10^8 \text{ J/m}^3$) is an order of magnitude higher than the heat of evaporation of typical liquids ($\sim (1 \text{ kg/m}^3)(10^6 \text{ J/kg}) = 10^7 \text{ J/m}^3$). This ensures that the heat transport capacity of a solid-liquid heat pipe will be significantly greater than that of a liquid-vapor heat pipe of similar size.
- The phase change material must preferably have a high thermal conductivity for best performance. However, for most applications, phase change materials with thermal conductivities of the order of $10^{-1}$-$10^0$ W/mK (i.e. values that are similar to that of liquids used in conventional liquid-vapor heat pipes) will be acceptable since the overall heat transfer rate is determined not only by the thermal conductivity but also by the associated fluid flow/heat flow processes. Further details of the heat transfer process in the present invention are discussed in a later section.
- It is very important that the density of the solid phase is greater than the density of the liquid phase of the material. This is necessary since heat transfer/transport in the present invention are driven by density differences between the two phases (in addition to the phase change processes). This will become clear in a later section when the functioning of the heat pipe and the fluid flow/heat transfer/transport mechanisms are described (see below).

Finally, the phase change material must have high physical and chemical stability (in particular, its thermal/transport properties must remain generally unchanged) over extended solid-liquid phase change cycles. Thus, the phase change materials may be modified by using suitable additive(s) and/or stabilizing processes prior to use to ensure that they remain stable over the expected lifetime of the heat pipe.

Based on the above, the preferred phase change material will depend on the actual application. For motors and generators with an internal temperature limit of 85 C that operate with an external coolant (or cooling air) at 25-40 C, the preferred phase change material is an organic material such as paraffin wax. For higher design temperatures (e.g. 125 C), phase change materials with higher melting points may be preferred.

The scraper assembly (300) is the second component of the device. In a preferred embodiment, it comprises an impeller with blades (320) placed within the hollow tube/enclosure (100) such that the blades are positioned adjacent to the heat dissipation zone (125). The clearance between the blades and the internal walls are very small (of the order of $10^{-4}$ m or less for a paraffin type phase change material) so that they scrape off phase change material adhering to the internal surface during the solidification/heat dissipation process (for a materials with higher thermal conductivity (such as low melting point metal alloys), the clearance can be greater). This ensures that the solid phase does not form a thick insulating layer in this area, and continuously recirculates it within the heat pipe. Given its function, the scraper material (e.g. high performance plastics or metals such as aluminum, steel) is selected such that it is wear resistant, has adequate mechanical strength and stiffness, and does not adversely react with the phase change material.

The driver (400) is the third component of the device. In a preferred embodiment, it comprises a magnetic coupling with two magnetic sub-assemblies. One magnetic sub-assembly (410) is integrated with the scraper assembly (300) inside the hollow tube/enclosure (100) while the other (420) is positioned adjacent to the first, but fixed outside the hollow tube/enclosure (100). Note that since the inner (410) and outer (420) sub-assemblies are magnetically coupled, they and the scraper assembly (300)/impeller blades (320) will remain stationary regardless of the motion the hollow tube/enclosure. As a result, when the heat pipe is operational, i.e. when it is rotating about its central (lengthwise) axis, there will be relative motion between the impeller blades (320) and the walls of the hollow tube/enclosure (100). Any solidifying phase change material (200) that adheres to the inner surface of the hollow tube/enclosure (100) will therefore be continuously removed from its surface (except possibly for a thin film corresponding to the gap between the scraper/impeller blades and the wall).

Heat pipe operation and the movement/location of the phase change material within the heat pipe depends on its rotational speed, orientation, degree of filling and the material properties (e.g. density, viscosity). For proper functioning, the rotational speed must be high enough to ensure that the phase change material is kept in contact with its heat transfer surfaces and there is continuous circulation covering the heat dissipation (125) and heat absorption (175) zones (with the arrows showing the direction of heat flow in FIG. 1). This is not an issue in the present application since motor speeds ($\gg 10^2$ rpm) ensure that the internal flow is in a centrifugal mode when using typical phase change materials (centrifugal mode comprises an internal flow pattern where the inner wall is generally covered by the fluid/suspension due to the action of the centrifugal force).

Note that it is not necessary to fill the entire heat pipe with the phase change material, but the heat pipe must contain enough material such that the melt rate is matched by the solidification rate under steady state operating conditions. In general, for a given phase change material, higher heat fluxes and heat loads will require larger quantities of the material, with the maximum amount being limited by the internal volume of the heat pipe. At the same time, higher operating speeds will be compatible with a smaller amount of the phase change material (due to more efficient heat transfer and faster circulation).

The solid-liquid heat pipe operates as follows:

a. As the heat pipe rotates about its central lengthwise axis, the phase change material is forced to the inner circumferential walls due to centrifugal forces. Since the density of the solid phase is greater than that of the liquid phase, the two phases will tend to stratify with the heavier solids (225) being forced next to the walls of the hollow tube/enclosure, and the liquid phase concentrating in a inner layer (250) next to it (identified by the "dashed" lines in FIG. 1). Perfect/complete (i.e. 100%) separation of the two phases is not required or expected during heat pipe operation. Thus, the region next to the wall may not comprise a pure solid phase, but is a slurry with high solids content (225), whereas the interior region comprises a mostly liquid material (250).

b. As the solid phase change material (225) is forced against the tube wall, the tangential (relative to the wall) component of the centrifugal force will move the material in an axial direction along the wall. At the heat absorption region (175), the solid particles will melt and the excess liquid phase will be forced radially inwards by the solid particles that follow. The fixed internal volume will ensure that the liquid phase will flow back to the heat dissipation region (125) where it will tend to solidify at the walls. The scraper blades (320) continuously remove adhered solids from the wall, which then flows back to the heat absorption area. Thus, in addition to the bulk movement resulting from the centrifugal force, the phase change material will circulate continuously in an axial direction (as shown by the "arrows" in the interior of the heat pipe in FIG. 1).

c. Heat transfer in the heat absorption area is very efficient since the centrifugal force constantly moves the solid material towards the wall. This force is proportional to $\Delta\rho a_r$, where $\Delta\rho$ is the density difference between the solid and liquid phases ($\sim 10^2$ kg/m$^3$) and $a_r$ is the centrifugal acceleration ($\sim \gg 100$ m/s$^2$ for typical motors). This force is high enough to drive the bulk of the liquid phase away from heat transfer surface leaving only a thin liquid film (thickness d$\sim 10^{-4}$-$10^{-5}$ m or less) between the solid phase and the wall. Thus, the effective heat transfer coefficient at the heat absorption surface is of the order of $10^4$-$10^5$ W/m$^2$K or more for a typical phase change material and operating conditions. Similar high heat transfer rates are also obtained at the heat dissipation region due to the continuous scraping action at the surface.

d. The velocities of the phase change material in the heat pipe are very high since these result from the tangential acceleration along the wall. This acceleration is much greater than 1 g even for relatively small taper angles ($\sim (a_r)(\alpha) \sim \gg (100)(0.1) = 10$ m/s$^2$ for a taper angle $\alpha = 0.1$ rad ($\sim$5-6 degrees)). At the same time, the effective heat capacity of the circulating phase change material is also enhanced since this comprises a combination of the sensible heat and the latent heat of melting/solidification of the material. Since the heat transport capacity is proportional to these two factors, very high heat transport rates are present in the solid-liquid heat pipe.

Figure 2:
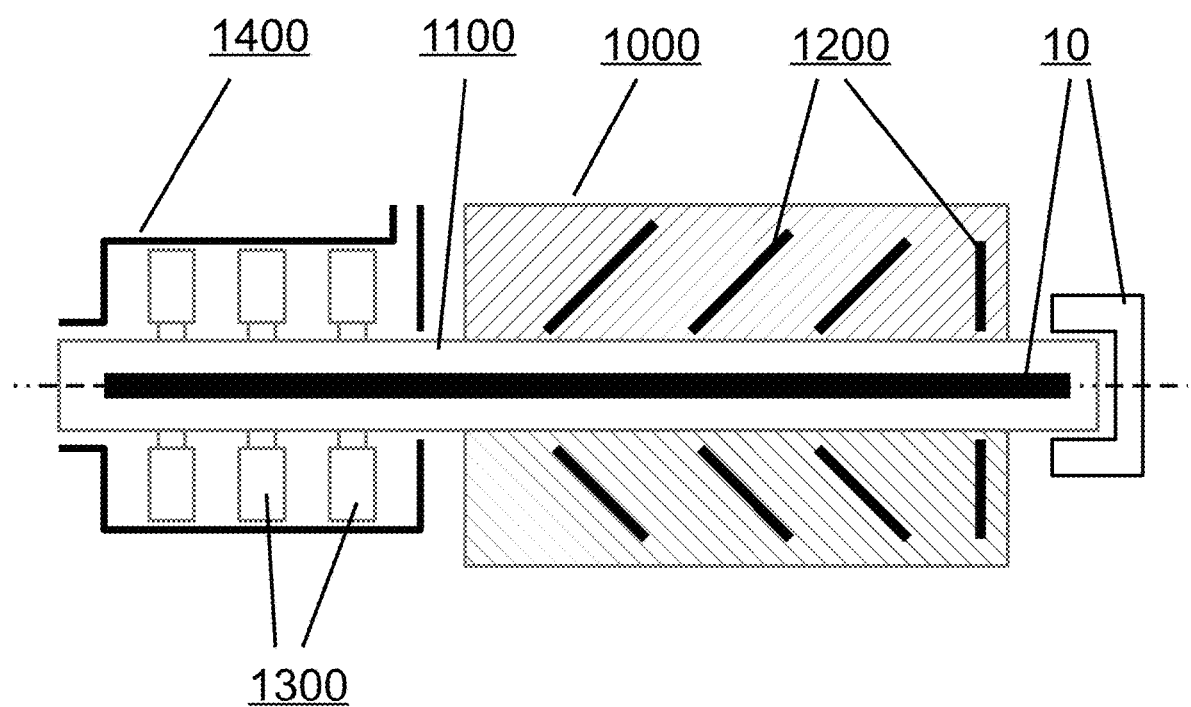
FIG. 2 shows a rotor assembly incorporating a solid-liquid heat pipe.

FIG. 2 shows a schematic diagram showing a preferred embodiment of a rotor assembly (1000) utilizing a solid-liquid heat pipe. Heat generated is transferred via conduction to the motor shaft (1100) that has a solid-liquid phase change heat pipe (10) integrated within it. In regions of localized high heat fluxes, revolving heat pipes (1200) are used (optionally) to transfer heat more efficiently towards the shaft. Heat transferred by the solid liquid heat pipe is dissipated in a exterior region that can be more easily cooled.

For lower heat loads, the heat is dissipated from the heat pipe directly to the ambient air using extended surfaces (1300). These may be designed strictly for heat transfer, or may be part of a fan or blower assembly and may incorporate a shroud (1400), etc. For higher heat loads, a liquid coolant may be used instead of air, with the heat absorbed by the coolant being dissipated to the ambient in a separate region (not shown) together with heat generated by the stator, etc. as convenient.

It is important to note that the solid-liquid heat pipe will be completely sealed, and therefore will be highly reliable like conventional liquid-vapor heat pipes. However, it has many advantages due to its unique features:

a. The heat transfer rates in the heat absorption/dissipation regions are high due to very efficient heat transfer modes, i.e. close-contact melting and scraped surface solidification. Note that the high speed rotational motion and corresponding fluid/solids flows will enhance the heat transfer rates well beyond that expected in standard close contact/scraped surface configurations.

b. In addition to its high heat transfer rates, the solid-liquid heat pipe has a very high heat transport capability relative to a liquid-vapor heat pipe. This is due to the high velocities and effective heat capacity of the phase change material used as the heat transfer medium.

c. Liquid-vapor heat pipes can be adversely affected by the presence of non-condensible gases. Excessive heat loads can also result in catastrophic failure (i.e rupture of heat pipe) due to very high internal pressures associated with rapid evaporation of the internal fluid. There are no such issues in this invention. This reduces manufacturing costs and further enhances the reliability of a solid-liquid heat pipe.

The present invention is not limited to the above described embodiments, and different variations and modifications that may be evident to one skilled in the art are possible without departing from its overall scope. For example, specific features that will enhance manufacturability of the connector components can and will be incorporated into the above embodiments to ensure that it can be manufactured at a reasonable cost (e.g. supports/bearings for scraper assembly, using a mixture of materials or commercial/industrial grade phase change material instead of a laboratory grade pure material, etc.). Other variations of the above configuration include the following:

a. The preferred embodiment described above uses only a phase change material as the working material. In other embodiments, the working material may incorporate a suspending liquid in addition to the phase change material (e.g. to create a suspension or emulsion). In this approach, the suspending liquid acts not only as a "carrier" to transport the solid-liquid phase change material, but also performs some heat heat transfer/transport function by virtue of its presence. Thus, it is selected so that it does not (a) react adversely with the phase change material (b) evaporate or freeze in the temperature range of operation, and (c) has a density that is less than that of the solid phase change material.

b. It is also possible to use micro/macro-encapsulated phase change materials, shape stabilized phase change materials, solid-solid phase change materials, etc. (e.g. Best et al. (U.S. Pat. No. 4,003,426, 1977), Salyer (U.S. Pat. No. 5,565,132, 1996), Jahns et al. (U.S. Pat. No. 6,200,681, 2001), Xing et al, (U.S. Pat. No. 7,442,410, 2008)) in the present invention particularly when a "carrier" fluid as in (a) above is present. Since these will not adhere to the wall surface at the heat dissipation region, the scraping mechanism can be eliminated thereby simplifying the overall design (though it most cases it may be advantageous to retain it to enhance heat transfer and to ensure no fouling in case of capsule breakage, etc.). Another alternative to achieve the same goal would be to use a "non-stick" wall coating that prevents the phase change material from adhering to the wall during solidification (or keeps it within acceptable limits through the life of the heat pipe).

c. A linear taper is shown on the interior wall surface (110) of the heat pipe in the preferred configuration of FIG. 1. In more advanced designs, a variable taper (or more complex internal geometries) may be more advantageous with taper being matched locally with the heat transfer rate (with higher tapers in regions with higher heat loads/higher melt rates for example). It is also important to note that though a taper beneficial, it is not essential for a solid-liquid heat pipe since internal flows and heat transfer are driven not just by centrifugal forces, but also by (i) heat pipe orientation, (ii) density gradients due to temperature variations, (iii) Coriolis forces, (iv) end effects at the closed ends, (v) interaction between the solid and liquid phases, and (vi) momentum received via the scraper mechanism. Thus, the taper may be eliminated in certain simple designs.

d. In the preferred configuration, the scraper blades (320) are configured to function only in the heat dissipation region. In alternate designs, the scraper may be extended, and in an extreme case, encompass the entire length (and end caps) of the heat pipe to enhance mixing, flow and heat transfer.

This may be particularly important when the mass of phase change material in the heat pipe is high, i.e. when the phase change material fills most of the internal volume, or when alternative forms of phase change materials are used (see a-b above).

e. In the preferred embodiment, the drive mechanism comprises a stationary external component (420) that is magnetically coupled to the internal scraper assembly. In special cases, this external component (420) may be incorporated with (or comprise) the stator itself. Alternatively, in other designs, the external component (420) can be non-stationary (e.g. rotating or oscillating coaxially with the shaft: note that the stationary design is a "special" case of the more general rotating/oscillating scraper), as long as there is relative motion between the scraper blades (320) and the inner wall surface (110) of the heat pipe. This approach may make the device more versatile since this can provide better control over heat transfer, particularly during startup, low speed/off-design operations (e.g. to ensure that the internal flow is in a centrifugal mode) and/or in devices that encounter high (or highly varying) heat loads.

f. As discussed earlier, it is not necessary to fill the heat pipe entirely with the phase change material. Thus, the internal void space can easily accommodate the slightly larger volume of the less dense liquid phase that is created during operation. For high heat load heat pipes with large quantities of phase change material or for some heat pipes comprising an additional suspending liquid, it may be preferable to modify the design to separately account for this additional volume (e.g. via a compressible bladder(s) integrated with the scraper assembly (300)). This will ensure that internal pressures do not become excessive locally due to localized solidification under variable loads.

g. The drive mechanism (400) and the scraper blades (320)/heat dissipation zones (125) are at opposite ends of the shaft in the configuration shown in FIG. 1. This has been done for ease of visualization/presentation of the invention, and is not required. In high temperature systems, it may be preferable to have both at the same end to ensure that the magnetic coupling is not affected by Curie temperature constraints.

h. In the preferred embodiment, the scraper assembly (300) comprises an impeller with blades (320) that are used to remove the solid phase that may adhere to the wall. Note that it is possible to use other mechanical features to achieve the same purpose as is done in numerous mixing/chemical engineering applications.

i. The preferred embodiment uses a magnetic coupling to drive the scraper assembly (300). This is not necessary and alternatives are possible. For example, mechanically coupled or internal electrically driven scrapers may be used since they can provide greater torque and versatility. However, these approaches are more complex since they may require the use of rotary seals to ensure that there is no leakage/loss of phase change material from the sealed tube/enclosure. Note that the overall system is still simpler than a pumped cooling system since shaft cooling is required only at the end(s) like with other heat pipe configurations.

What is claimed is:

1. A rotating assembly of an electric motor or generator with a solid-liquid phase change cooling system, comprising a heat source and a shaft dissipating heat to an external heat sink, said rotating assembly having a rotational speed,
    said heat source generating heat at a temperature,
    said external heat sink comprising one of ambient air or a coolant in contact with said shaft and receiving heat from said shaft at a maximum heat dissipation temperature,
    said shaft comprising a central length-wise axis and a rotating heat pipe for heat transfer and transport from said heat source to said heat sink,
    said rotating heat pipe comprising a sealed enclosure aligned with said central length-wise axis of said shaft, a scraper subassembly and a driver subassembly,
    said sealed enclosure comprising an interior volume with walls, and a solid-liquid phase change material in said interior volume,
    said walls comprising a heat absorption zone and a heat dissipation zone,
    said heat absorption zone located adjacent to said heat source to absorb heat,
    said heat dissipation zone located adjacent to said heat sink to dissipate heat,
    said solid-liquid phase change material having a solid density greater than liquid density, and a melting temperature range and a solidification temperature range,
    said melting temperature range one of entirely or mostly lower than said temperature of said heat source,
    said solidification temperature range one of entirely or mostly higher than said maximum heat dissipation temperature,
    said scraper subassembly positioned within said interior volume and comprising a mechanical feature positioned adjacent to the said walls at said heat dissipation zone,
    said driver subassembly comprising a first magnetic coupling element positioned within said interior volume and a second magnetic coupling element positioned outside said enclosure,
    said first magnetic coupling element and said second magnetic coupling element coupled magnetically to have coupled angular motions,
    said first magnetic coupling element integrated with said scraper subassembly to have same angular motions, and
    said driver subassembly rotating or oscillating said second magnetic coupling element about said central lengthwise axis at an angular speed that is different from said rotational speed thereby causing relative motion between said scraper subassembly and said sealed enclosure/tube to limit the deposition of said solid-liquid phase change material on said walls at said heat dissipation zone.

2. The rotating assembly of claim 1, wherein said shaft comprises enhanced surfaces in contact with said heat sink.

3. The rotating assembly of claim 1, wherein said melting temperature range and said solidification temperature range are identical.

4. The rotating assembly of claim 1, wherein one or both of said melting temperature range and solidification temperature range are less than 0.5 C.

5. The rotating assembly of claim 1, wherein said sealed enclosure comprises a suspending liquid in said interior volume, said suspending liquid having a density lower than density of said solid phase change material.

6. The rotating assembly of claim 1, wherein one or both of said solid-liquid phase change material or said enclosure walls are modified so that said solid-liquid phase change material does not adhere to said walls of said heat dissipation region during solidification.

7. The rotating assembly of claim 1, wherein said scraper subassembly comprises an impeller and said mechanical feature comprises a blade.

8. The rotating assembly of claim 1, wherein said internal volume has a linear taper, said linear taper providing a larger cross-section at said heat absorption zone relative to said heat dissipation zone.

9. The rotating assembly of claim 1, wherein said angular speed of said second magnetic coupling element is zero.

10. A rotating heat pipe for heat transfer and transport from an external heat source to an external heat sink, comprising a sealed enclosure/tube, a scraper subassembly and a driver subassembly,
    said rotating heat pipe having a rotational speed about a central length-wise rotational axis,
    said sealed enclosure/tube comprising interior volume with walls, and a solid-liquid phase change material in said interior volume,
    said external heat source having a temperature,
    said external heat sink having a maximum heat dissipation temperature,
    said walls comprising a heat absorption zone and a heat dissipation zone,
    said heat absorption zone located adjacent to said external heat source to absorb heat,
    said heat dissipation zone located adjacent to said external heat sink to dissipate heat, said solid-liquid phase change material having a solid density greater than liquid density, and a melting temperature range and a solidification temperature range, said melting temperature range one of entirely or mostly lower than said temperature of said heat source, said solidification temperature range one of entirely or mostly higher than said maximum heat dissipation temperature, said scraper subassembly positioned within said interior volume and comprising a mechanical feature positioned adjacent to the said walls at said heat dissipation zone, said driver subassembly comprising a first magnetic coupling element positioned within said interior volume and a second magnetic coupling element positioned outside said sealed enclosure/tube, said first magnetic coupling element and said second magnetic coupling element coupled magnetically to have coupled angular motions, said first magnetic coupling element integrated with said scraper subassembly to have same angular motions, and said driver subassembly rotating or oscillating said second magnetic coupling element about said central length-wise rotational axis at an angular speed that is different from said rotational speed thereby causing relative motion between said scraper subassembly and said sealed enclosure/tube to limit the deposition of said solid-liquid phase change material on said walls at said heat dissipation zone.

11. The rotating heat pipe of claim 10, wherein said melting temperature range and said solidification temperature range are the same.

12. The rotating heat pipe of claim 10, wherein one or both of said melting temperature range and solidification temperature range are less than 0.5 C.

13. The rotating heat pipe of claim 10, wherein said sealed enclosure/tube comprises a suspending liquid in said interior volume, said suspending liquid having a density lower than density of said solid phase change material.

14. The rotating heat pipe of claim 10, wherein one or both of said solid-liquid phase change material or said enclosure walls are modified so that said solid-liquid phase change material does not adhere to said walls of said heat dissipation region during solidification.

15. The rotating heat pipe of claim 10, wherein said scraper subassembly comprises an impeller and said mechanical feature comprises a blade.

16. The rotating heat pipe of claim 10, wherein said internal volume has a linear taper, said linear taper providing a larger cross-section at said heat absorption zone relative to said heat dissipation zone.

17. The rotating heat pipe of claim 10, wherein said angular speed of said second magnetic coupling element is zero.

18. A rotating heat pipe for heat transfer and transport from an external heat source to an external heat sink, comprising a sealed enclosure/tube, a scraper subassembly and a driver subassembly, said rotating heat pipe having a rotational speed about a central length-wise rotational axis, said hollow enclosure/tube comprising an interior volume with walls, and a solid-liquid phase change material in said interior volume, said external heat source having a temperature, said external heat sink having a maximum heat dissipation temperature, said walls comprising a heat absorption zone and a heat dissipation zone, said heat absorption zone located adjacent to said external heat source to absorb heat, said heat dissipation zone located adjacent to said external heat sink to dissipate heat, said solid-liquid phase change material having a solid density greater than liquid density, and a melting temperature range and a solidification temperature range, said melting temperature range one of entirely or mostly lower than said temperature of said heat source, said solidification temperature range one of entirely or mostly higher than said maximum heat dissipation temperature, said scraper subassembly positioned within said interior volume and comprising a mechanical feature positioned adjacent to the said walls at said heat dissipation zone, said driver subassembly comprising a drive element positioned outside said sealed enclosure/tube and a driven element inside said sealed tube/enclosure, said drive element coupled to said driven element utilizing a leakproof coupling means, said driven element integrated with said scraper subassembly to have same angular motions and said drive element rotating or oscillating said driven element about said central length-wise rotational axis at an angular speed that is different from said rotational speed thereby causing relative motion between said scraper subassembly and said sealed enclosure/tube.

19. The rotating heat pipe of claim 18, wherein one or both of said melting temperature range and solidification temperature range are less than 0.5 C.

20. The rotating heat pipe of claim 18, wherein said sealed enclosure/tube comprises a suspending liquid in said interior volume, said suspending liquid having a density lower than the density of said solid phase change material.

21. The rotating heat pipe of claim 18, wherein one or both of said solid-liquid phase change material or said enclosure walls are modified so that said solid-liquid phase change material does not adhere to said walls of said heat dissipation region during solidification.

* * * * *